United States Patent
Li (10) Patent No.: US 7,478,180 B1
(45) Date of Patent: Jan. 13, 2009

(54) VIRTUALIZING A COMMUNICATIONS CHANNEL IN WHICH BLOCKS OF DATA ARE DIVIDED INTO MULTIPLE SUB-BLOCKS FOR CONVEYANCE

(75) Inventor: Qicheng Li, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 237 days.

(21) Appl. No.: 11/479,213

(22) Filed: Jun. 29, 2006

Related U.S. Application Data (60) Provisional application No. 60/750,601, filed on Dec. 14, 2005.

(51) Int. Cl.
- *G06F 13/12* (2006.01)
- *G06F 13/38* (2006.01)
- *G06F 3/00* (2006.01)
- *G06F 5/00* (2006.01)
- *G06F 9/455* (2006.01)

(52) U.S. Cl. .............. 710/62; 703/23; 703/24; 710/52; 719/324

(58) Field of Classification Search .......... None
See application file for complete search history.

(56) References Cited

U.S. PATENT DOCUMENTS 6,742,076 B2 * 5/2004 Wang et al. ............ 710/314
6,823,403 B2 * 11/2004 Gulick et al. ............ 710/22
7,111,086 B1 * 9/2006 Ecoleston et al. ............ 710/33

* cited by examiner

*Primary Examiner*—Henry W. H. Tsai
*Assistant Examiner*—Michael Sun
(74) *Attorney, Agent, or Firm*—Darryl A. Smith; Rajeev Madnawat

(57) ABSTRACT

An interface for a communications channel, in which blocks of data are divided into multiple sub-blocks for conveyance, such as a USB (Universal Serial Bus) interface, is virtualized. One or more host drivers may provide an interface with a physical device that supports the communications channel. Virtualization software emulates a virtual device that appears to support the communications channel, and one or more guest drivers may provide an interface with the virtual device, so that the guest drivers receive one or more guest data block buffers for use in conveying data over the communications channel and generate multiple corresponding guest data sub-block buffers for each guest data block buffer, and the virtualization software obtains access to the guest data sub-block buffers. The guest data sub-block buffers are scanned for an indication of a boundary between multiple guest data block buffers, such as an IOC (Interrupt on Complete) flag being set. When consecutive guest data block boundaries are encountered, a new host data block buffer is formed between the consecutive guest data block boundaries. The new host data block buffer is then made available to the host drivers.

24 Claims, 5 Drawing Sheets

VIRTUALIZING A COMMUNICATIONS CHANNEL IN WHICH BLOCKS OF DATA ARE DIVIDED INTO MULTIPLE SUB-BLOCKS FOR CONVEYANCE

This application claims priority of U.S. Provisional Patent Application Ser. No. 60/750,601 entitled "Virtualizing a Communications Channel in which Blocks of Data are Divided into Multiple Sub-Blocks for Conveyance," filed 14 Dec. 2005.

BACKGROUND OF THE INVENTION

1. Field of the Invention

This invention relates to transfers of data involving a computer system, and, in particular, to transfers of data in which blocks of data are divided into multiple sub-blocks for conveyance.

2. Description of the Related Art

The invention may be implemented as one or more computer programs or as one or more computer program modules embodied in one or more computer readable media. The computer readable media may be based on any existing or subsequently developed technology for embodying computer programs in a manner that enables them to be read by a computer. For example, the computer readable media may comprise one or more CDs (Compact Discs), one or more DVDs (Digital Versatile Discs), some form of flash memory device, a computer hard disk and/or some form of internal computer memory, to name just a few examples. An embodiment of the invention, in which one or more computer program modules is embodied in one or more computer readable media, may be made by writing the computer program modules to any combination of one or more computer readable media. Such an embodiment of the invention may be sold by enabling a customer to obtain a copy of the computer program modules in one or more computer readable media, regardless of the manner in which the customer obtains the copy of the computer program modules. Thus, for example, a computer program implementing the invention may be purchased electronically over the Internet and downloaded directly from a vendor's web server to the purchaser's computer, without any transference of any computer readable media. In such a case, writing the computer program to a hard disk of the web server to make it available over the Internet may be considered a making of the invention on the part of the vendor, and the purchase and download of the computer program by a customer may be considered a sale of the invention by the vendor, as well as a making of the invention by the customer.

The invention generally relates to virtualizing a communications channel in which blocks of data are divided into multiple sub-blocks prior to conveyance. One example of such a communications channel is a Universal Serial Bus (USB) in a standard personal computer, although the invention may also be applied to other existing or yet to be developed communications channels. A USB communications channel is used as an example throughout this description, but a person of skill in the art will be able to extend or adapt these teachings to other types of communications channels.

The invention may also be applied in computer systems involving a wide variety of different types or degrees of virtualization. The primary example in this description is based on virtualizing a substantially complete personal computer hardware platform within a physical computer system that is also based on the same personal computer hardware platform. However, the invention may be implemented in a wide variety of virtual computer systems, involving a wide variety of hardware and software platforms and a wide variety of different types and degrees of virtualization. For example, the invention may also be implemented in virtual computer systems in which the hardware platform that is virtualized is a different hardware platform from that of the underlying physical computer system, such as a cross-platform virtualization system. The invention may also be implemented in virtual computer systems in which the hardware platform that is virtualized has never been implemented in any physical computer system. The invention may also be implemented in virtual computer systems in which less than a substantially complete hardware platform is virtualized. For example, the invention may be implemented in so-called paravirtualized systems, in which one or more aspects of a hardware platform are not fully virtualized, so that an operating system (OS) for the hardware platform must be modified in some manner to execute on the virtualized hardware platform. The invention may also be implemented in computer systems involving substantially less virtualization than the virtual computer systems mentioned thus far, even including computer systems in which only a single communications channel is virtualized, while all other physical resources are not virtualized.

In particular, the invention may be implemented in existing virtualization products of the assignee of this patent, VMware, Inc. Consequently, the general architectures of two types of products of VMware, a "hosted" virtual computer system and a "kernel-based" virtual computer system, are described below to provide background for the detailed description of the invention.

Hosted Virtual Computer System

Figure 1:
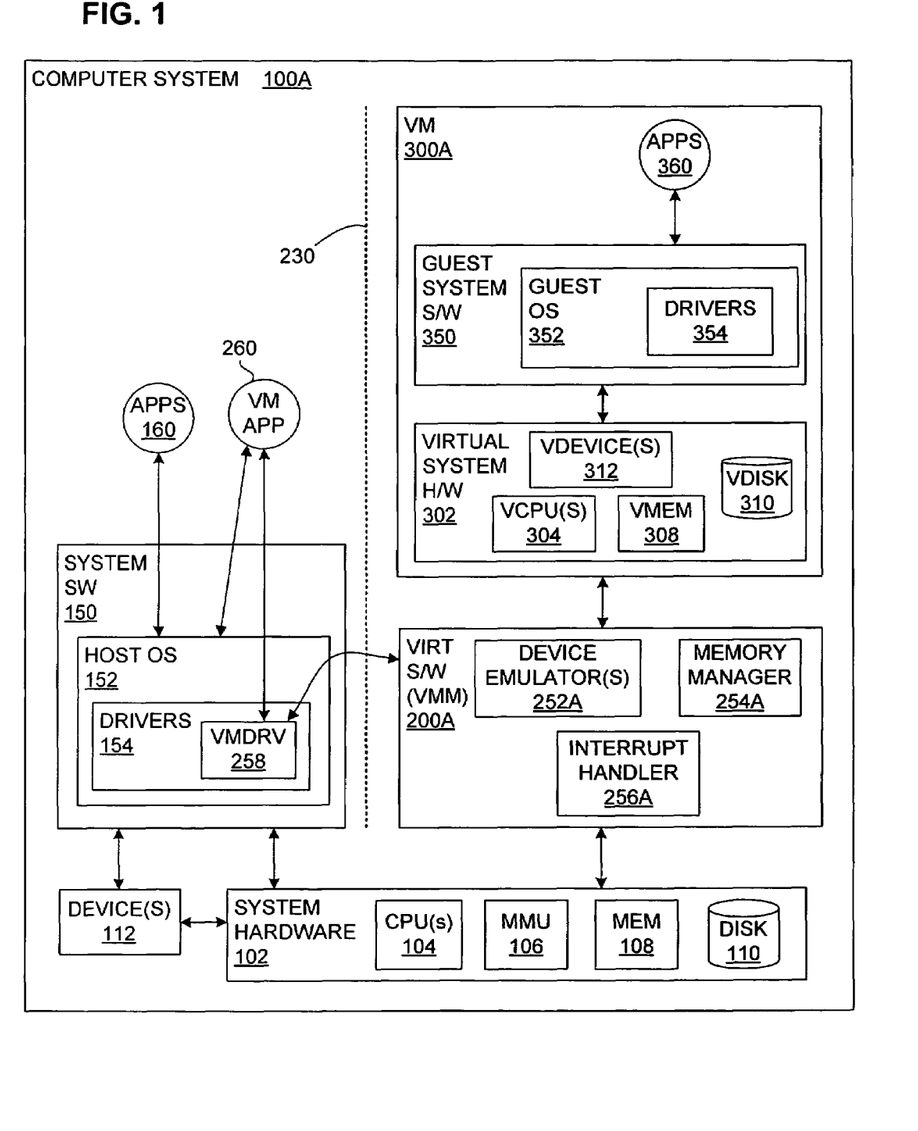
FIG. 1 illustrates the main components of a generalized hosted virtual computer system.

FIG. 1 illustrates the main components of a "hosted" virtual computer system 100A as generally implemented in the Workstation virtualization product of VMware, Inc. The virtual computer system 100A supports a virtual machine (VM) 300A. As is well known in the field of computer science, a VM is a software abstraction or a "virtualization," often of an actual physical computer system. As in conventional computer systems, both system hardware 102 and system software 150 are included. The system hardware 102 includes one or more processors (CPUs) 104, which may be a single processor, or two or more cooperating processors in a known multiprocessor arrangement. The system hardware also includes system memory 108, one or more disks 110, and some form of memory management unit (MMU) 106. The system memory is typically some form of high-speed RAM (random access memory), whereas the disk is typically a non-volatile, mass storage device. As is well understood in the field of computer engineering, the system hardware also includes, or is connected to, conventional registers, interrupt-handling circuitry, a clock, etc., which, for the sake of simplicity, are not shown in the figure.

The system software 150 typically either is or at least includes an OS 152, which has drivers 154 as needed for controlling and communicating with various devices 112, and usually with the disk 110 as well. Conventional applications 160 (APPS), if included, may be installed to run on the hardware 102 via the system software 150 and any drivers needed to enable communication with devices.

The VM 300A—also known as a "virtual computer"—is often a software implementation of a complete computer system. In the VM, the physical system components of a "real" computer are emulated in software, that is, they are virtualized. Thus, the VM 300A will typically include virtualized ("guest") system hardware 302, which in turn includes one or more virtual CPUs 304 (VCPU), virtual system memory 308 (VMEM), one or more virtual disks 310 (VDISK), and one or more virtual devices 312 (VDEVICE), all of which are implemented in software to emulate the corresponding components of an actual computer. The concept, design and operation of virtual machines are well known in the field of computer science.

The VM 300A also has system software 350, which may include a guest OS 352, as well as drivers 354 as needed, for example, to control the virtual device(s) 312. The guest OS 352 may, but need not, simply be a copy of a conventional, commodity OS. Of course, most computers are intended to run various applications, and a VM is usually no exception. Consequently, by way of example, FIG. 1 illustrates one or more applications 360 (APPS) installed to run on the guest OS 352; any number of applications, including none at all, may be loaded for running on the guest OS, limited only by the requirements of the VM. Software running in the VM 300A, including the guest OS 352 and the guest applications 360, is generally referred to as "guest software."

Note that although the virtual hardware "layer" 302 is a software abstraction of physical components, the VM's system software 350 may be the same as would be loaded into a hardware computer. The modifier "guest" is used here to indicate that the VM, although it acts as a "real" computer from the perspective of a user, is actually just computer code that is executed on the underlying "host" hardware and software platform 102, 150. Thus, for example, I/O to a virtual device 312 will actually be carried out by I/O to a corresponding hardware device 112, but in a manner transparent to the VM.

Some interface is usually required between the VM 300A and the underlying "host" hardware 102, which is responsible for actually executing VM-related instructions and transferring data to and from the actual physical memory 108, the processor(s) 104, the disk(s) 110 and the other device(s) 112. One advantageous interface between the VM and the underlying host system is often referred to as a virtual machine monitor (VMM), also known as a virtual machine "manager." Virtual machine monitors have a long history, dating back to mainframe computer systems in the 1960s. See, for example, Robert P. Goldberg, "Survey of Virtual Machine Research," IEEE Computer, June 1974, p. 34-45.

A VMM is usually a relatively thin layer of software that runs directly on top of host software, such as the system software 150, or directly on the hardware, and virtualizes the resources of the (or some) hardware platform. FIG. 1 shows virtualization software 200A running directly on the system hardware 102. The virtualization software 200A may be a VMM, for example. Thus, the virtualization software 200A is also referred to herein as a VMM 200A. The VMM 200A will typically include at least one device emulator 252A, which may also form the implementation of the virtual device 312. The VMM 200A may also include a memory manager 254A that maps memory addresses used within the VM 300A (for the virtual memory 308) to appropriate memory addresses that can be applied to the physical memory 108. The VMM also usually tracks and either forwards (to the host OS 152) or itself schedules and handles all requests by its VM for machine resources, as well as various faults and interrupts. FIG. 1 therefore illustrates an interrupt (including fault) handler 256A within the VMM. The general features of VMMs are well known and are therefore not discussed in further detail here.

FIG. 1 illustrates a single VM 300A merely for the sake of simplicity; in many installations, there will be more than one VM installed to run on the common hardware platform; all may have essentially the same general structure, although the individual components need not be identical. Also in FIG. 1, a single VMM 200A is shown acting as the interface for the single VM 300A. It would also be possible to include the VMM as part of its respective VM, that is, in each virtual system. Although the VMM is usually completely transparent to the VM, the VM and VMM may be viewed as a single module that virtualizes a computer system. The VM and VMM are shown as separate software entities in the figures for the sake of clarity. Moreover, it would also be possible to use a single VMM to act as the interface for more than one VM, although it will in many cases be more difficult to switch between the different contexts of the various VMs (for example, if different VMs use different guest operating systems) than it is simply to include a separate VMM for each VM. This invention works with all such VM/VMM configurations.

In all of these configurations, there must be some way for the VM to access hardware devices, albeit in a manner transparent to the VM itself. One solution would of course be to include in the VMM all the required drivers and functionality normally found in the host OS 152 to accomplish I/O tasks. Two disadvantages of this solution are increased VMM complexity and duplicated effort—if a new device is added, then its driver would need to be loaded into both the host OS and the VMM. A third disadvantage is that the use of a hardware device by a VMM driver may confuse the host OS, which typically would expect that only the host's driver would access the hardware device. A different method for enabling the VM to access hardware devices has been implemented by VMware, Inc., in its Workstation virtualization product. This method is also illustrated in FIG. 1.

In the system illustrated in FIG. 1, both the host OS 152 and the VMM 200A are installed at system level, meaning that they both run at the greatest privilege level and can therefore independently modify the state of the hardware processor(s). For I/O to at least some devices, however, the VMM may issue requests via the host OS. To make this possible, a special driver VMdrv 258 is installed as any other driver within the host OS 152 and exposes a standard API (Application Program Interface) to a user-level application VMapp 260. When the system is in the VMM context, meaning that the VMM is taking exceptions, handling interrupts, etc., but the VMM wishes to use the existing I/O facilities of the host OS, the VMM calls the driver VMdrv 258, which then issues calls to the application VMapp 260, which then carries out the I/O request by calling the appropriate routine in the host OS.

In FIG. 1, a vertical line 230 symbolizes the boundary between the virtualized (VM/VMM) and non-virtualized (host software) "worlds" or "contexts." The driver VMdrv 258 and application VMapp 260 thus enable communication between the worlds even though the virtualized world is essentially transparent to the host system software 150.

Figure 2:
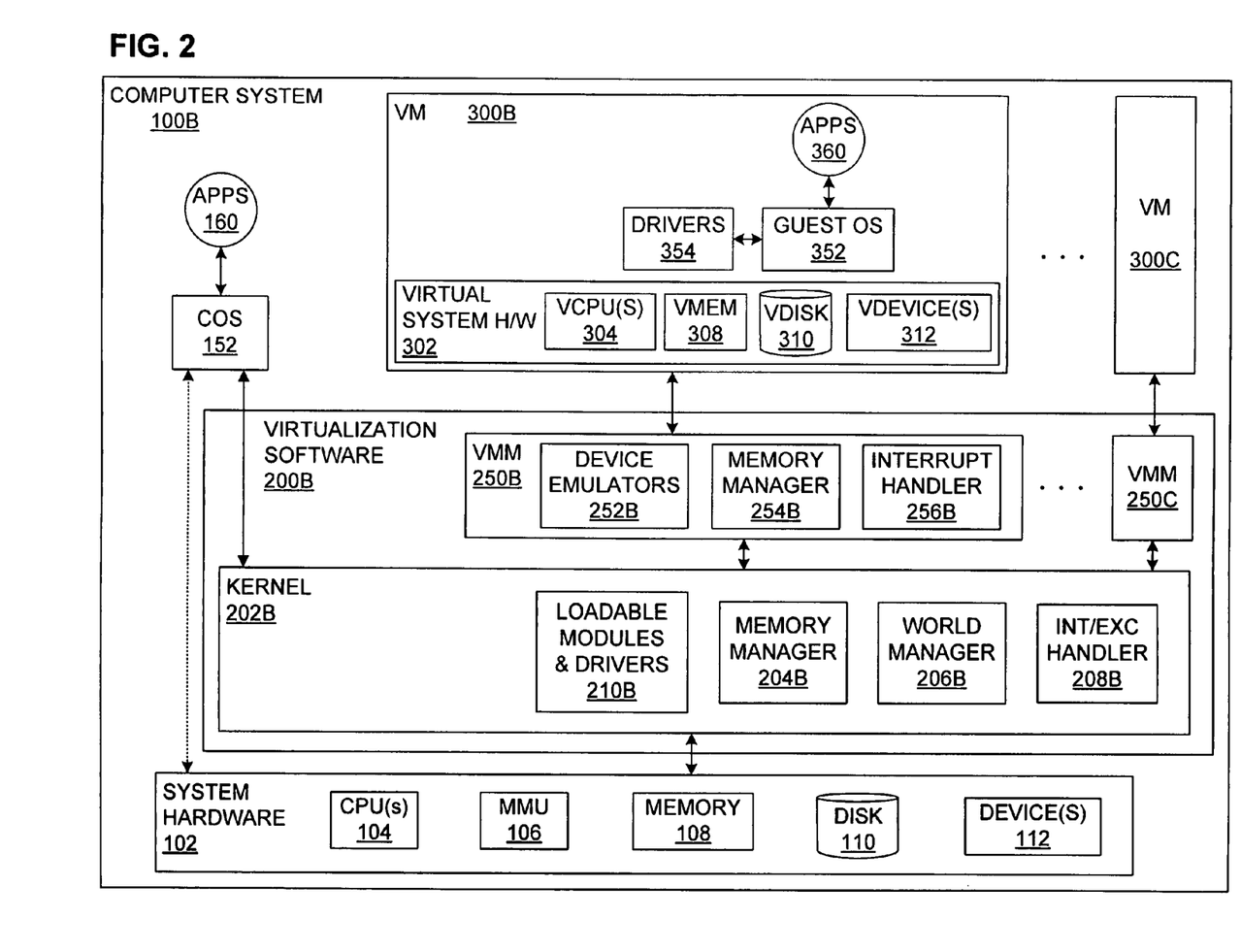
FIG. 2 illustrates the main components of a generalized kernel-based virtual computer system.

In some cases, however, it may be beneficial to deploy VMMs on top of a thin software layer, a "kernel," constructed specifically for this purpose. FIG. 2 illustrates an implementation in which a kernel 202B takes the place of and performs the conventional functions of the host OS, including handling actual I/O operations. The kernel-based virtual computer system of FIG. 2 is described in greater detail below. Compared with a system in which VMMs run directly on the hardware platform, use of a kernel offers greater modularity and facilitates provision of services that extend across multiple virtual machines (for example, resource management). Also, compared with the hosted deployment, a kernel may offer greater performance because it can be co-developed with the VMM and be optimized for the characteristics of a workload consisting of VMMs.

As used herein, the "host" OS therefore means either the native OS 152 of the underlying physical computer, a specially constructed kernel 202B as described below, or whatever other system-level software handles actual I/O operations, takes interrupts, etc. for the VM. The invention may be used in all the different configurations mentioned above.

Kernel-Based Virtual Computer System

FIG. 2 illustrates the main components of a "kernel-based" virtual computer system 100B as generally implemented in the ESX Server virtualization product of VMware, Inc. A kernel-based virtualization system of the type illustrated in FIG. 2 is described in U.S. patent application Ser. No. 09/877, 378 ("Computer Configuration for Resource Management in Systems Including a Virtual Machine"), which is incorporated here by reference. The main components of this system and aspects of their interaction are, however, outlined below.

The virtual computer system 100B includes one or more VMs, such as a first VM 300B and a second VM 300C. Each VM is installed as a "guest" on a "host" hardware platform, which, as shown in FIG. 2, may be the same as the hardware platform 102 of the virtual computer system 100A of FIG. 1. Thus, FIG. 2 shows the hardware platform 102 as including the one or more processors (CPUs) 104, the system memory 108, one or more disks 110, the MMU 106, and the device(s) 112.

Each VM 300B, 300C may include the same virtualized ("guest") system hardware 302 as the VM 300A of FIG. 1. Thus, FIG. 2 shows the VM 300B as including the virtual system hardware 302, including the one or more virtual CPUs 304 (VCPU), the virtual system memory 308 (VMEM), the one or more virtual disks 310 (VDISK), and the one or more virtual devices 312 (VDEVICE). Each VM 300B, 300C may also include the guest OS 352, the drivers 354 and the one or more applications 360 (APPS) of the VM 300A of FIG. 1, as shown in FIG. 2 for the VM 300B.

Also as shown in FIG. 2, the virtual computer system 100B includes virtualization software 200B, which includes a VMM 250B that supports the VM 300B and a VMM 250C that supports the VM 300C. The VMMs 250B and 250C may be substantially the same as the virtualization software (VMM) 200A shown in FIG. 1. Thus, FIG. 2 shows the VMM 250B as including one or more device emulators 252B, which may be substantially the same as the device emulators 252A, a memory manager 254B, which may be substantially the same as the memory manager 254A, and an interrupt handler 256B, which may be substantially the same as the interrupt handler 256A.

The device emulators 252B emulate system resources for use within the VM 300B. These device emulators will then typically also handle any necessary conversions between the resources as exported to the VM and the actual physical resources. One advantage of such an arrangement is that the VMM 250B may be set up to expose "generic" devices, which facilitates VM migration and hardware platform-independence. For example, the VMM may be set up with a device emulator 252B that emulates a standard Small Computer System Interface (SCSI) disk, so that the virtual disk 310 appears within the VM 300B to be a standard SCSI disk connected to a standard SCSI adapter, whereas the underlying, actual, physical disk 110 may be something else. In this case, a standard SCSI driver is installed into the guest OS 352 as one of the drivers 354. The device emulator 252B then interfaces with the driver 354 and handles disk operations for the VM 300B. The device emulator 252B then converts the disk operations from the VM 300B to corresponding disk operations for the physical disk 110.

When the computer system 100B of FIG. 2 is booted up, an existing operating system 152, which may be the same as the host OS 152 of FIG. 1, may be at system level and the kernel 202B may not yet even be operational within the system. In such case, one of the functions of the OS 152 may be to make it possible to load the kernel 202B, after which the kernel runs on the native hardware 102 and manages system resources. In effect, the kernel, once loaded, displaces the OS 152. Thus, the kernel 202B may be viewed either as displacing the OS 152 from the system level and taking this place itself, or as residing at a "sub-system level." When interposed between the OS 152 and the hardware 102, the kernel 202B essentially turns the OS 152 into an "application," which has access to system resources only when allowed by the kernel 202B. The kernel then schedules the OS 152 as if it were any other component that needs to use system resources.

The OS 152 may also be included to allow applications unrelated to virtualization to run; for example, a system administrator may need such applications to monitor the hardware 102 or to perform other administrative routines. The OS 152 may thus be viewed as a "console" OS (COS). In such implementations, the kernel 202B preferably also includes a remote procedure call (RPC) mechanism to enable communication between, for example, the VMMs 250B, 250C and any applications 160 (APPS), which may be the same as the applications 160 of FIG. 1, installed to run on the COS 152.

In kernel-based systems such as the one illustrated in FIG. 2, there must be some way for the kernel 202B to communicate with the VMMs 250B, 250C. In general, a VMM can call into the kernel 202B but the kernel cannot call directly into the VMM. The conventional technique for overcoming this is for the kernel to post "actions" (requests for the VMM to do something) on an action queue stored in memory 108. As part of the VMM code, the VMM looks at this queue periodically, and always after it returns from a kernel call and also before it resumes a VM. One typical action is the "raise interrupt" action: If the VMM sees this action it will raise an interrupt to the VM in the conventional manner.

As is known, for example, from U.S. Pat. No. 6,397,242 (Devine, et al., 28 May 2002), some virtualization systems allow VM instructions to run directly (in "direct execution") on the hardware CPU(s) when possible. When necessary, however, VM execution is switched to a technique known as "binary translation," during which the VM is running in the VMM. In any systems where the VM is running in direct execution when it becomes necessary for the VMM to check actions, the kernel must interrupt the VMM so that it will stop executing VM instructions and check its action queue. This may be done using known programming techniques.

The kernel 202B handles not only the various VMM/VMs, but also any other applications running on the kernel, as well as the COS 152 and even the hardware CPU(s) 104, as entities that can be separately scheduled. In this disclosure, each schedulable entity is referred to as a "world," which contains a thread of control, an address space, machine memory, and handles to the various device objects that it is accessing. Worlds are stored in a portion of the memory space controlled by the kernel. More specifically, the worlds are controlled by a world manager, represented in FIG. 2 within the kernel 202B as module 206B. Each world also has its own task structure, and usually also a data structure for storing the hardware state currently associated with the respective world.

There will usually be different types of worlds: 1) system worlds, which are used for idle worlds, one per CPU, and a helper world that performs tasks that need to be done asynchronously; 2) a console world, which is a special world that runs in the kernel and is associated with the COS 152; and 3) virtual machine worlds.

Worlds preferably run at the most-privileged level (for example, in a system with an x86 architecture, this will be level CPL0), that is, with full rights to invoke any privileged CPU operations. A VMM, which, along with its VM, constitutes a separate world, therefore may use these privileged instructions to allow it to run its associated VM so that it performs just like a corresponding "real" computer, even with respect to privileged operations.

When the world that is running on a particular CPU is preempted by or yields to another world, then a world switch has to occur. A world switch involves saving the context of the current world and restoring the context of the new world such that the new world can begin executing where it left off the last time that it was running.

The first part of the world switch procedure that is carried out by the kernel is that the current world's state is saved in a data structure that is stored in the kernel's data area. Assuming the common case of an underlying x86 architecture, the state that is saved will typically include: 1) the exception flags register; 2) general purpose registers; 3) segment registers; 4) the instruction pointer (EIP) register; 5) the local descriptor table register; 6) the task register; 7) debug registers; 8) control registers; 9) the interrupt descriptor table register; 10) the global descriptor table register; and 11) the floating point state. Similar state information will need to be saved in systems with other hardware architectures.

After the state of the current world is saved, the state of the new world can be restored. During the process of restoring the new world's state, no exceptions are allowed to take place because, if they did, the state of the new world would be inconsistent upon restoration of the state. The same state that was saved is therefore restored. The last step in the world switch procedure is restoring the new world's code segment and instruction pointer (EIP) registers.

When worlds are initially created, the saved state area for the world is initialized to contain the proper information such that when the system switches to that world, then enough of its state is restored to enable the world to start running. The EIP is therefore set to the address of a special world start function. Thus, when a running world switches to a new world that has never run before, the act of restoring the EIP register will cause the world to begin executing in the world start function.

Switching from and to the COS world requires additional steps, which are described in U.S. patent application Ser. No. 09/877,378, mentioned above. Understanding the details of this process is not necessary for understanding the present invention, however, so further discussion is omitted.

The kernel 202B includes a memory management module 204B that manages all machine memory that is not allocated exclusively to the COS 152. When the kernel 202B is loaded, the information about the maximum amount of memory available on the machine is available to the kernel, as well as information about how much of it is being used by the COS. Part of the machine memory is used for the kernel 202B itself and the rest is used for the virtual machine worlds.

Virtual machine worlds use machine memory for two purposes. First, memory is used to back portions of each world's memory region, that is, to store code, data, stacks, etc. For example, the code and data for the VMM 250B is backed by machine memory allocated by the kernel 202B. Second, memory is used for the guest memory of the virtual machine. The memory management module may include any of a variety of algorithms for dynamically allocating memory among the different VM's 300B, 300C.

Interrupt and exception handling is related to the concept of "worlds" described above. As mentioned above, one aspect of switching worlds is changing various descriptor tables. One of the descriptor tables that is loaded when a new world is to be run is the new world's IDT (Interrupt Descriptor Table). The kernel 202B therefore preferably also includes an interrupt/exception handler 208B that is able to intercept and handle (using a corresponding IDT in the conventional manner) interrupts and exceptions for all devices on the machine. When a VMM world is running, whichever IDT was previously loaded is replaced by the VMM's IDT, such that the VMM will handle all interrupts and exceptions.

The VMM will handle some interrupts and exceptions completely on its own. For other interrupts/exceptions, it will be either necessary or at least more efficient for the VMM to call the kernel to have the kernel either handle the interrupts/exceptions itself, or to forward them to some other sub-system such as the COS. One example of an interrupt that the VMM can handle completely on its own, with no call to the kernel, is a check-action IPI (Inter-Processor Interrupt). One example of when the VMM preferably calls the kernel, which then forwards an interrupt to the COS, would be where the interrupt involves devices such as a mouse, which is typically controlled by the COS. The VMM may forward still other interrupts to the corresponding VM.

In some embodiments of the invention, the kernel 202B is responsible for providing access to all devices on the physical machine. In addition to other modules that the designer may choose to load onto the system for access by the kernel, the kernel will therefore typically load conventional drivers as needed to control access to devices. Accordingly, FIG. 2 shows a module 210B containing loadable kernel modules and drivers. The kernel 202B may interface with the loadable modules and drivers in a conventional manner, using an API or similar interface.

Universal Serial Bus

The invention may be implemented in either the hosted virtual computer system of FIG. 1 or the kernel-based virtual computer system of FIG. 2, along with other computer systems, to virtualize a USB interface. The invention may also be used to virtualize other interfaces, but this description is primarily limited to virtualizing a USB interface for simplicity. Thus, the device(s) 112 in FIGS. 1 and 2 may include a USB host controller for providing a USB interface. USB interfaces are described in detail in a book entitled "Universal Serial Bus System Architecture, Second Edition," published by Mindshare, Inc. in 2001, and written by Don Anderson and Dave Dzatko. This book is incorporated here by reference, and may be referred to as "the USB System Architecture book" below. A pending U.S. patent application, which is owned by the assignee of this patent, also relates to USB interfaces, along with other interfaces. That pending application is U.S. patent application Ser. No. 10/080,782 ("High-Speed Packet Transfer In Computer Systems With Multiple Interfaces"), which is also incorporated here by reference.

The USB host controller in the device(s) 112 may implement an Open Host Controller Interface (OHCI), a Universal Host Controller Interface (UHCI), an Enhanced Host Controller Interface (EHCI), or any yet to be developed host controller interface. Any such host controller interface is referred to herein as an XHCI interface, for generality, so that any reference to XHCI herein can generally be interpreted as a reference to OHCI, to UHCI, to EHCI and/or to any such yet to be developed host controller interface. The official specifications for the OHCI, the UHCI and the EHCI may also be referenced for more detailed information about USB interfaces. The host OS 152 of FIG. 1 would include one or more drivers 154, and the kernel 202B of FIG. 2 would include one or more drivers 210B, for interfacing with the XHCI host controller in a conventional manner.

The virtualization software 200A of FIG. 1 may include a device emulator 252A that emulates a USB interface for the VM 300A, while the virtualization software 200B of FIG. 2 may include a device emulator 252B that emulates a USB interface for the VM 300B. Thus, each of these USB device emulators may emulate a virtual device 312 for its respective VM, where these virtual devices 312 may be virtual XHCI host controllers. Such a virtual XHCI host controller may implement the same host controller interface as a corresponding physical XHCI host controller, or it may implement a different host controller interface.

So the virtual system hardware 302 in the VM 300A of FIG. 1 or in the VM 300B of FIG. 2 includes a virtual XHCI host controller, which may be used by the guest software in the respective VM for communicating with other devices on a virtual USB bus. In each VM, the guest OS 352 may include one or more conventional drivers 354 for interfacing with the virtual XHCI host controller, in a conventional manner. From the perspective of the guest software in the VMs 300A and 300B, or from the perspective of a user of the VMs, the USB interface in the respective VM may generally appear to be a regular, physical USB interface.

When guest software within the VMs 300A and 300B attempts to use the virtual USB interface to communicate with devices that appear to be connected to the virtual USB bus, the guest software provides input/output (I/O) requests to the virtual XHCI controller. However, the I/O requests must generally be communicated in some form to the physical XHCI controller within the system hardware 102 for conveyance across the physical USB bus. Also, responses to these I/O requests must generally be communicated from the physical XHCI controller to the virtual XHCI controller. The XHCI controller emulator may assume primary responsibility for communicating I/O requests and responses between the virtual XHCI controller and the physical XHCI controller. This invention may be implemented within an XHCI controller emulator, for example, to enable this communication of I/O requests and responses between a virtual XHCI controller and a physical XHCI controller. A method and apparatus for providing this communication is described in greater detail below.

SUMMARY OF THE INVENTION

One embodiment of the invention is a method for virtualizing a communications channel in which blocks of data are divided into multiple sub-blocks for conveyance. This method may be implemented in a computer system in which one or more host drivers provide an interface with a physical device that supports the communications channel, a virtualization software emulates a virtual device that appears to support the communications channel, and one or more guest drivers provide an interface with the virtual device, wherein the one or more guest drivers receive multiple guest data block buffers for use in conveying data over the communications channel and generate multiple corresponding guest data sub-block buffers for individual guest data block buffers, wherein the virtualization software obtains access to the guest data sub-block buffers, and wherein the one or more host drivers expect to access host data block buffers. This method comprises scanning guest data sub-block buffers for an indication of a first boundary between a first guest data block buffer and a second guest data block buffer; scanning additional guest data sub-block buffers for an indication of a second boundary between the second guest data block buffer and a third guest data block buffer; and forming a host data block buffer encompassing the guest data sub-block buffers between the first boundary and the second boundary, and making the host data block buffer available to the one or more host drivers.

In some embodiments of the invention, the communications channel comprises a USB (Universal Serial Bus) interface, the guest data block buffers and host data block buffers are USB request block buffers, and the guest data sub-block buffers are transfer descriptors. In some such embodiments of the invention, the physical device is an OHCI (Open Host Controller Interface) controller, a UHCI (Universal Host Controller Interface) controller, or an EHCI (Enhanced Host Controller Interface) controller. Also, in some such embodiments of the invention, the virtual device is an OHCI (Open Host Controller Interface) controller, a UHCI (Universal Host Controller Interface) controller, or an EHCI (Enhanced Host Controller Interface) controller. Also, in some such embodiments of the invention, an indication of a boundary between multiple guest data block buffers comprises one or more transfer descriptors having an IOC (Interrupt on Complete) flag that is set followed by one or more transfer descriptors having an IOC flag that is not set.

Also, in some embodiments of the invention, an indication of a boundary between multiple guest data block buffers comprises one or more guest data sub-block buffers having an interrupt flag that is set followed by one or more guest data sub-block buffers having an interrupt flag that is not set. Also, in some embodiments of the invention, the first, second and third guest data block buffers represent IN transfers. In other embodiments of the invention, the first, second and third guest data block buffers represent OUT transfers, and the step of forming the host data block buffer comprises copying data from guest data sub-block buffers to the host data block buffer.

The invention may also be implemented in other embodiments, such as a computer program embodied in a computer readable medium or a computer system.

DETAILED DESCRIPTION

As described above, this invention may be implemented in a wide variety of ways, in a wide variety of computer systems. This detailed description primarily covers a single example of implementing the invention in a virtual computer system, such as in the hosted virtual computer system of FIG. 1 or in the kernel-based virtual computer system of FIG. 2. A person of skill in the art will be able to extend or adapt the teachings from this example to implement the invention in a wide variety of other circumstances, in a wide variety of other computer systems.

Figure 3:
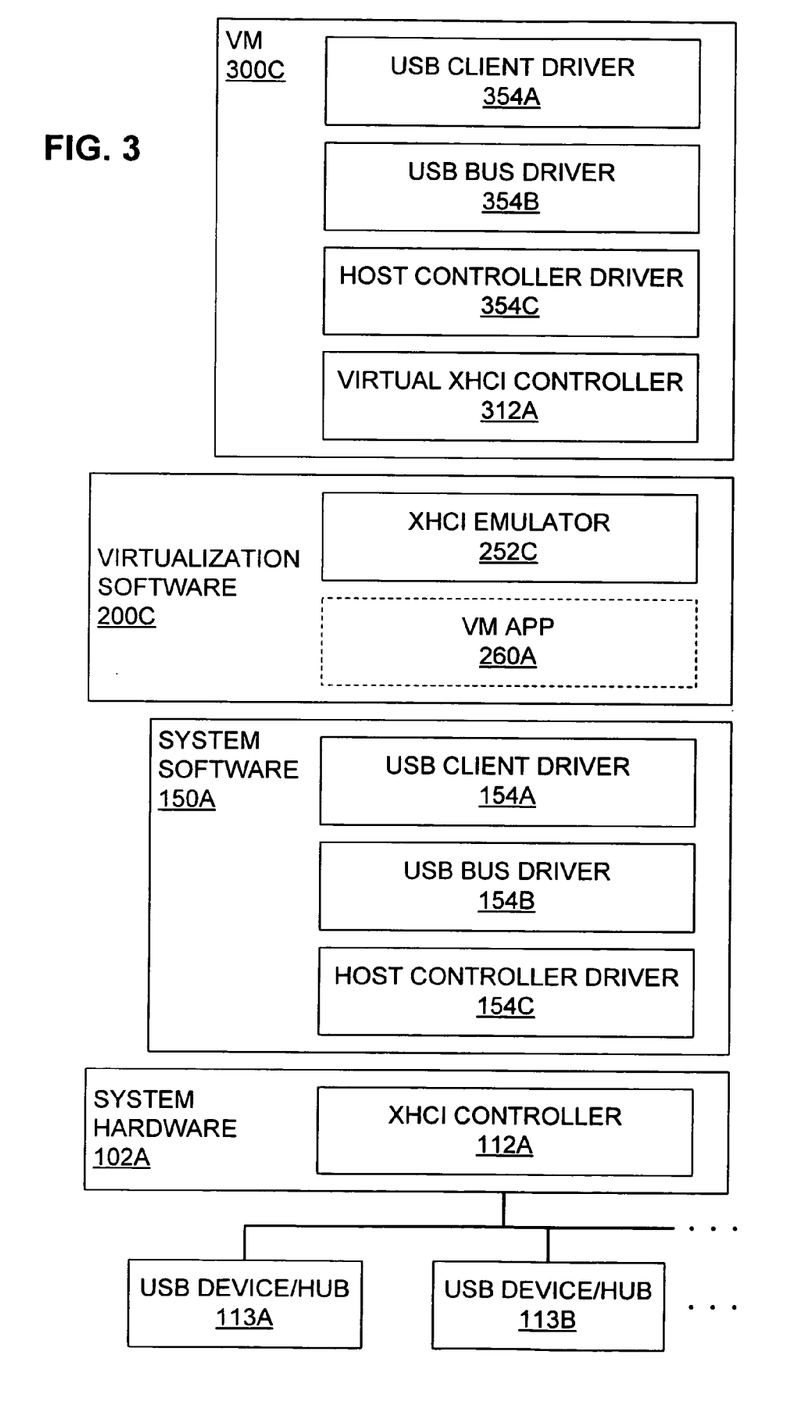
FIG. 3 illustrates the main components involved in implementing a virtualized USB (Universal Serial Bus) interface in a virtual computer system.

FIG. 3 illustrates the main components involved in implementing a virtualized USB (Universal Serial Bus) interface in a virtual computer system, such as the hosted virtual computer system of FIG. 1 or the kernel-based virtual computer system of FIG. 2. The virtual computer system of FIG. 3 includes system hardware 102A, which may be substantially the same as the system hardware 102 of FIGS. 1 and 2. The system hardware 102A includes an XHCI host controller 112A, which may be one of the device(s) 112 of FIGS. 1 and 2. The XHCI host controller 112A may be an OHCI host controller, a UHCI host controller or an EHCI host controller, for example. The XHCI controller 112A interfaces with one or more USB ports on the computer system to establish a USB bus. One or more USB devices and/or hubs may be connected to the USB bus and the XHCI controller 112A, such as a first USB device and/or hub 113A and a second USB device and/or hub 113B, as illustrated in FIG. 3. The XHCI controller 112A, the USB bus and the USB devices 113A and 113B may be conventional USB components and devices, such as a standard USB component in a standard personal computer, connected to a standard USB keyboard and a standard USB printer, for example.

FIG. 3 also shows system software 150A that executes on the system hardware 102A. The system software 150A may be the system software 150 of FIG. 1 or the kernel 202B of FIG. 2, for example. The system software 150A includes one or more drivers for interfacing with the XHCI controller 112A. FIG. 3 shows the system software 150A as including a USB client driver 154A, a USB bus driver 154B and a host controller driver 154C. The USB client driver 154A, the USB bus driver 154B and the host controller driver 154C may be included within the drivers 154 of FIG. 1 or the loadable modules and drivers 210B of FIG. 2, for example. The USB client driver 154A, the USB bus driver 154B and the host controller driver 154C may be conventional drivers for the system software 150A and for interfacing with the XHCI controller 112A. The USB System Architecture book may be referenced for a general description of the operation of such USB drivers.

FIG. 3 also shows virtualization software 200C, which may be the virtualization software 200A of FIG. 1 or the virtualization software 200B of FIG. 2. The virtualization software 200C includes an XHCI host controller emulator 252C, which may be one of the device emulator(s) 252A of FIG. 1 or one of the device emulator(s) 252B of FIG. 2. The virtualization software 200C may also include a VM (Virtual Machine) application 260A, which may be the same as the VM application 260 of FIG. 1. The kernel-based virtual computer system of FIG. 2 generally does not have any software entity comparable to the VM application 260 of FIG. 1, so the VM application 260A is shown as being optional in FIG. 3 by using a dashed line. The operation of the XHCI emulator 252C and the VM application 260A are described in greater detail below.

FIG. 3 also shows a VM 300C, which may be substantially the same as the VM 300A of FIG. 1 or the VM 300B of FIG. 2. Thus, the VM 300C may include the virtual system hardware 302 of FIGS. 1 and 2, although this virtual system hardware is not shown in FIG. 3, for simplicity. The XHCI emulator 252C in the virtualization software 200C exports a virtual XHCI host controller 312A into the virtual system hardware of the VM 300C. The XHCI host controller 312A may be an OHCI host controller, a UHCI host controller or an EHCI host controller, for example. The XHCI controller 312A may be the same type of controller as the physical XHCI controller 112A, or it may be a different type of controller. The emulation of the virtual XHCI controller 312A may generally be performed in a conventional manner, except as described below.

The virtual XHCI controller 312A may appear, from the perspective of guest software within the VM 300C and a user of the VM, to be an ordinary, physical XHCI controller. Thus, the VM 300C may also include a guest OS, such as the guest OS 352 of FIGS. 1 and 2, although such a guest OS is not shown in FIG. 3, for simplicity. The guest OS, or other system software, within the VM 300C, may include one or more drivers for interfacing with the virtual XHCI controller 312A. Thus, FIG. 3 shows the VM 300C as including a USB client driver 354A, a USB bus driver 354B and a host controller driver 354C, all of which may be part of the drivers 354 of FIGS. 1 and 2, and all of which may be conventional for the controller type of the virtual XHCI controller 312A and for the guest OS or other system software of the VM 300C.

The operation and functionality of the USB client drivers 354A and 154A, the USB bus drivers 354B and 154B, the host controller drivers 354C and 154C, and the XHCI host controllers 312A and 112A are described in greater detail in the USB System Architecture book, referenced above.

Figure 4:
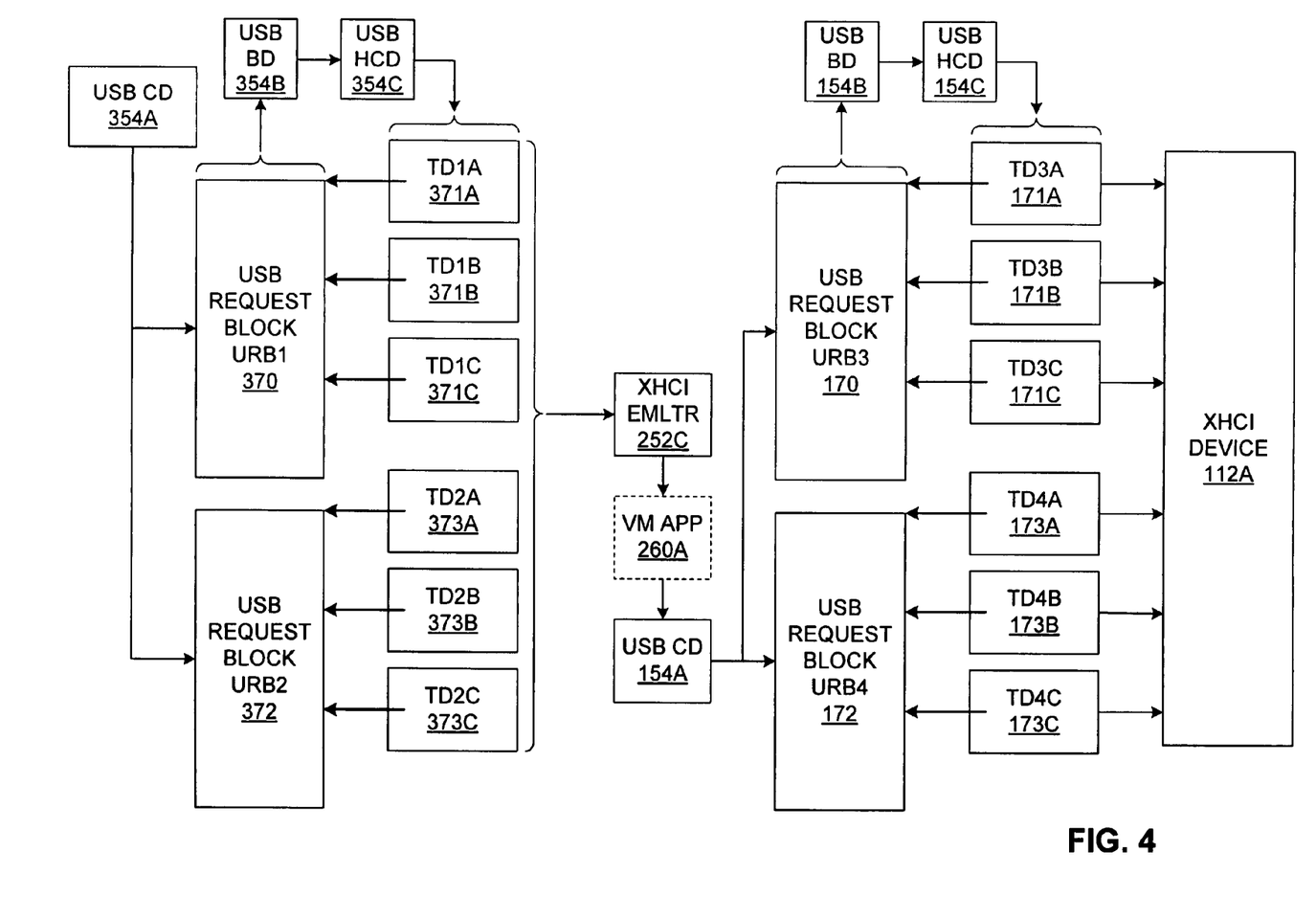
FIG. 4 illustrates the generation and processing of data blocks and data sub-blocks, according to one embodiment of the invention, for implementing a virtualized USB interface in a virtual computer system.

FIG. 4 illustrates data blocks and data sub-blocks that are involved in the virtualization of a USB interface, along with some of the software and hardware entities that generate and/or process these data blocks and sub-blocks. Reference will also be made to the functional units illustrated in FIG. 3 during this description of FIG. 4.

Suppose that a software entity within the VM 300C wants to retrieve data from, or send data to, a device connected to the virtual USB bus to which the VM 300C appears to be connected. The software entity generates an I/O request in a conventional manner. In response, the USB client driver 354A generates one or more USB request blocks (URBs) in a conventional manner. FIG. 4 shows a first URB, URB1 370, and a second URB, URB2 372. If the guest software entity is retrieving data from the USB device (an IN transfer), then the URBs contain empty data buffer(s) into which the retrieved data is to be written; while if the guest software entity is sending data to the USB device (an OUT transfer), then the URBs contain data buffer(s) that contain the data that is to be sent to the USB device. In this patent, an "empty data buffer" is sized to receive a specific amount of data, but the data has not yet been written into the buffer. The USB client driver 354A typically generates one URB at a time, and notifies the USB bus driver 354B after each URB is generated. Thus, the USB client driver 354A may generate the URB1 370 and then notify the USB bus driver 354B of the URB1 370, and then, later, the USB client driver 354A may generate the URB2 372 and then notify the USB bus driver 354B of the URB2 372.

When the USB bus driver 354B is notified of a URB, the USB bus driver 354B generates a plurality of transfer descriptors (TDs), based on the content of the URB, in a conventional manner. In this case, a URB may be referred to as a data block and the TDs that are generated from the URB may be referred to as data sub-blocks. As illustrated in FIG. 4, after receiving the URB1 370, the USB bus driver 354B generates a first TD, TD1A 371A, a second TD, TD1B 371B, and a third TD, TD1C 371C. In most real-life applications, however, a URB would generally give rise to significantly more TDs than just three. The TD1A 371A includes a pointer to a first portion of the URB1 370 (as shown by a line protruding from the TD1A 371A toward the URB1 370), the TD1B 371B includes a pointer to a second portion of the URB1 370, and the TD1C 371C includes a pointer to a third portion of the URB1 370. As also illustrated in FIG. 4, after receiving the URB2 372, the USB bus driver 354B generates a fourth TD, TD2A 373A, a fifth TD, TD2B 373B, and a sixth TD, TD2C 373C. The TD2A 373A includes a pointer to a first portion of the URB2 372, the TD2B 373B includes a pointer to a second portion of the URB2 372, and the TD2C 373C includes a pointer to a third portion of the URB2 372.

After the USB bus driver 354B generates TDs, the USB host controller driver 354C arranges the TDs (including TDs addressed to other USB devices and/or other endpoints of USB devices) into multiple frames (a "frame list") so that the frames of TDs may be processed by the virtual XHCI controller 312A (not shown in FIG. 4). The format for the frames generated by the USB controller driver 354C depends on the interface that is implemented by the virtual XHCI controller 312A (such as OHCI, UHCI or EHCI), and is described in the USB System Architecture book, on a web page maintained by the publisher of the USB System Architecture book, and/or in the respective XHCI specification.

The USB controller driver 354C expects that the virtual XHCI controller 312A will process the frames of TDs according to the respective XHCI specification. Very generally, the USB controller driver 354C expects the virtual XHCI controller 312A to process consecutive frames (or microframes for high speed transfers), processing one frame every 1 millisecond (or 125 microseconds for microframes). For each TD processed, the virtual XHCI controller 312A is expected to transfer data to a USB device or from a USB device, as specified in the respective TD. The virtual XHCI controller 312A is also supposed to increment an XHCI frame pointer every 1 millisecond (or 125 microseconds) to indicate an active frame that is currently being processed by the virtual XHCI controller 312A. The virtual XHCI controller 312A is also expected to raise IOC (Interrupt on Complete) interrupts, as appropriate, according to IOC flags in the TDs.

The primary purpose of the XHCI emulator 252C, within the virtualization software 200C, is to emulate the virtual XHCI controller 312A, processing the frames of TDs generated by the USB bus driver 354B and arranged by the USB controller driver 354C, incrementing the XHCI frame pointer, and raising IOC interrupts, using the physical USB interface to actually perform data transfers to and from USB devices. This invention may be implemented to enable the XHCI emulator 252C to emulate the virtual XHCI controller 312A in this manner. A method that may be performed by the XHCI emulator 252C to accomplish these tasks is described below in connection with FIG. 5.

Generally, the XHCI emulator 252C processes the TDs provided by the USB bus driver 354B and the USB controller driver 354C, and attempts to recreate the URB(s) that gave rise to these TDs. Thus, the XHCI emulator 252C processes the TD1A 371A, the TD1B 371B, the TD1C 371C, the TD2A 373A, the TD2B 373B and the TD2C 373C, and attempts to recreate the URB1 370 and the URB2 372, without any prior knowledge of the URBs 370 and 372, including even how many URBs gave rise to the 6 TDs 371A, 371B, 371C, 373A, 373B and 373C. Thus, as illustrated in FIG. 4, upon processing the 6 TDs 371A, 371B, 371C, 373A, 373B and 373C, the XHCI emulator 252C may generate a third URB, URB3 170, and a fourth URB, URB4 172, where the URB3 170 is intended to be substantially the same as the URB1 370 and the URB4 172 is intended to be substantially the same as the URB2 372.

If the TDs processed by the XHCI emulator 252C specify IN transfers, the resulting URBs will contain empty data buffers; while, if the TDs processed by the XHCI emulator 252C specify OUT transfers, the XHCI emulator 252C copies the data contained in the original URBs into the new URBs, using the pointers in the TDs to find the data in the original URBs. Thus, for example, if the TDs 371A, 371B and 371C specify OUT transfers, then the XHCI emulator 252C copies data from the URB1 370 into the URB3 170, and, if the TDs 373A, 373B and 373C specify OUT transfers, then the XHCI emulator 252C copies data from the URB2 372 into the URB4 172.

In this embodiment of the invention, once the XHCI emulator 252C generates the URB3 170 and the URB4 172, the USB client driver 154A in the system software 150A is notified of these URBs, which in turn notifies the USB bus driver 154B, so that the URBs may be processed, leading, indirectly, to data transfers using the physical USB interface. In the kernel-based virtual computer system of FIG. 2, the XHCI emulator 252C may directly notify the USB client driver 154A of the new URBs, but in the hosted virtual computer system of FIG. 1, the XHCI emulator 252C must indirectly notify the USB client driver 154A of the new URBs, using the VM application 260A. Thus, in FIG. 4, the VM application 260A is shown as being optional, by using a dashed line. The operation and use of the VM application 260A is substantially the same as the operation and use of the VM application 260 of FIG. 1, which is described above. In either the hosted virtual computer system of FIG. 1 or the kernel-based virtual computer system of FIG. 2, the USB client driver 154A is notified of, and has access to, the URB3 170 and the URB4 172.

Now the USB bus driver 154B processes the URB3 170 and the URB4 172 to generate a seventh TD, TD3A 171A, an eighth TD, TD3B 171B, a ninth TD, TD3C 171C, a tenth TD, TD4A 173A, an eleventh TD, TD4B 173B, and a twelfth TD, TD4C 173C, in the same general manner that the USB bus driver 354B processes the URB1 370 and the URB2 372 to generate the TDs 371A, 371B, 371C, 373A, 373B, and 373C. The USB host controller driver 154C also arranges the TDs 171A, 171B, 171C, 173A, 173B, and 173C into frames, along with other TDs addressed to other USB devices or endpoints, in the same general manner that the USB host controller driver 354C arranges the TDs 371A, 371B, 371C, 373A, 373B, and 373C into frames, along with other TDs addressed to other USB devices or endpoints, except that the USB host controller 154C arranges the TDs as required by the physical XHCI controller 112A, while the USB host controller driver 354C arranges the TDs as required by the virtual XHCI controller 312A, so that these two arrangements of TDs may differ, for example, if the virtual XHCI controller 312A implements a different controller interface than the physical XHCI controller 112A. Now, the physical XHCI controller 112A in the system hardware 102 can process these frames of TDs, in a conventional manner, according to the respective XHCI specification, and initiate IN and OUT transfers with USB devices connected to the physical USB bus.

The URB1 370, the URB2 372 and other URBs generated by guest software, such as the USB client driver 354A, are referred to herein as guest URBs. The TD1A 371A, the TD1B 371B, the TD1C 371C, the TD2A 373A, the TD2B 373B, the TD2C 373C and other TDs generated by guest software, such as the USB bus driver 354B, are referred to herein as guest TDs. The URB3 170, the URB4 172 and other URBs generated by the XHCI emulator 252C are referred to herein as host URBs. The TD3A 171A, the TD3B 171B, the TD3C 171C, the TD4A 173A, the TD4B 173B, the TD4C 173C and other TDs generated by the system software 150A, such as the USB bus driver 154B, are referred to herein as host TDs.

A process that is substantially the converse of the process described above is performed, using the same data blocks and the same data sub-blocks, when USB transfers are completed. Thus, the XHCI controller 1 12A modifies the host TDs as their transfers are completed, then the USB bus driver 154B modifies the host URBs accordingly, then the XHCI emulator 252C modifies the guest TDs accordingly, then the USB bus driver 354B modifies the guest URBs accordingly, and then the USB client driver 354A obtains the results of the USB transfers. For IN transfers, modifying the host TDs, the host URBs, the guest TDs and the guest URBs includes copying data that has been transferred from USB devices. The USB System Architecture book and the XHCI specifications may be consulted for a more description of this converse process.

Figure 5:
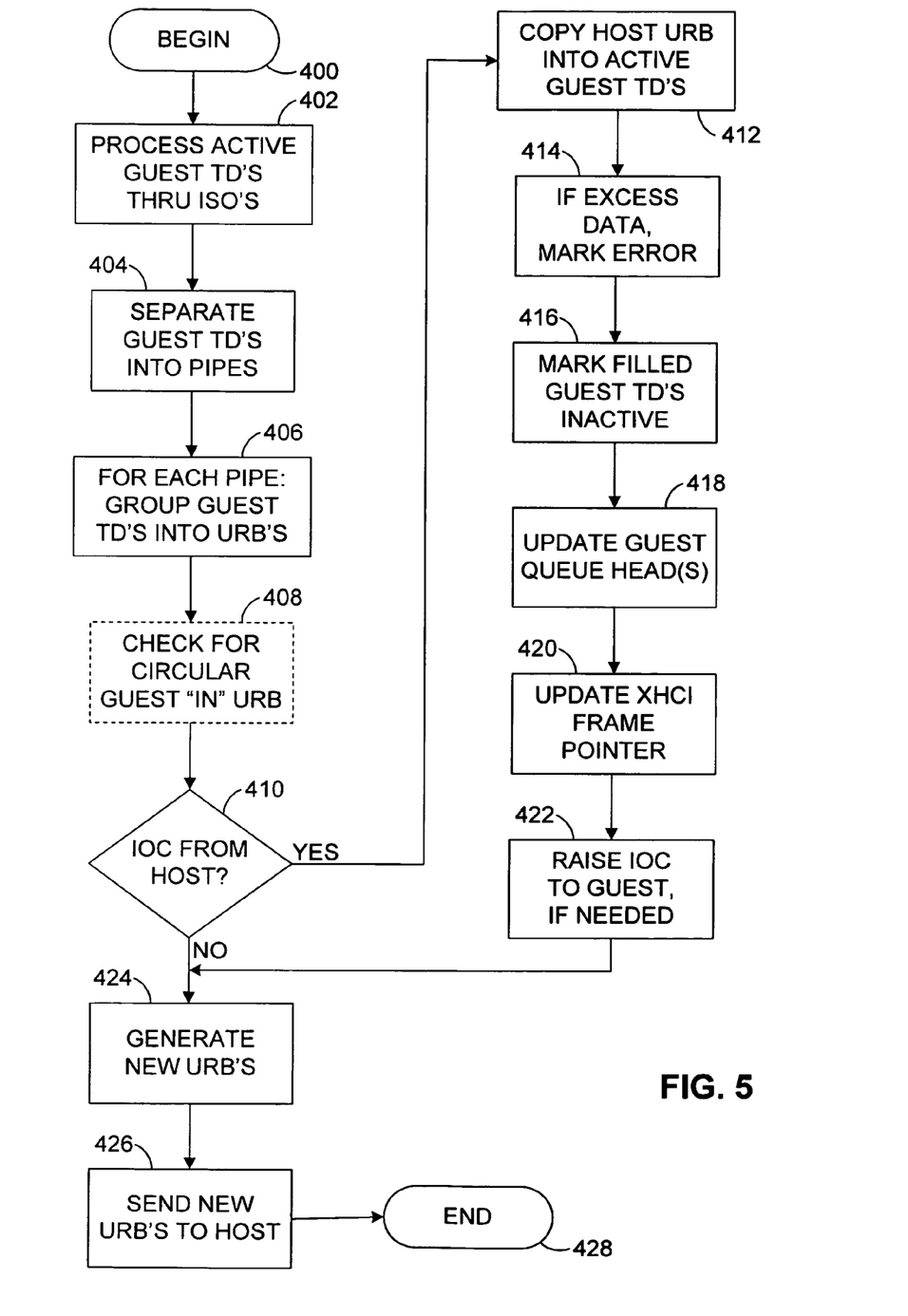
FIG. 5 illustrates a method, according to one embodiment of the invention, for emulating a virtual XHCI controller, when implementing a virtualized USB interface.

FIG. 5 illustrates a method that may be implemented in one embodiment of the invention to enable the XHCI emulator 252C to emulate the virtual XHCI controller 312A. Generally, in the method of FIG. 5, the XHCI emulator 252C processes guest TDs, generates corresponding host URBs, and sends the host URBs on to the USB client driver 154A (using the VM application 260A in a hosted virtual computer system); the XHCI emulator 252C updates the XHCI frame pointer; and the XHCI emulator 252C responds to IOC interrupts from the system hardware 102A, forwards I/O responses back to the guest and generates IOC interrupts in the VM 300C, when appropriate.

The method of FIG. 5 can be initiated by either of two events. First, the method of FIG. 5 is initiated by a timer event that occurs every 1 millisecond. Second, the method of FIG. 5 is initiated in response to an IOC interrupt from the system hardware 102A (or from the "host").

The method of FIG. 5 begins at an initial step 400. Next, at a step 402, the XHCI emulator 252C scans and processes frames of guest TDs, beginning at the frame that is pointed to by the XHCI frame pointer (which is maintained and updated by the XHCI emulator 252C) and proceeding to subsequent frames until it appears that all isochronous TDs have been processed. For example, the XHCI emulator 252C may continue processing frames of TDs until it encounters five frames in a row that have no isochronous transfers. For all of these frames, the XHCI emulator 252C processes all TDs that are marked as being active in the TD's Status field. If a TD is marked as not being active in its Status field, then the TD is skipped, and not processed.

The guest TDs in the frames processed by the XHCI emulator 252C will typically have a variety of TDs addressed to different USB devices and addressed to different endpoints within these USB devices. It is common to associate a different "pipe" with each endpoint of each USB device addressed by these multiple TDs. Thus, referring to FIG. 3, the USB device 113A may have a first endpoint and a second endpoint, while the USB device 113B may have a third endpoint and a fourth endpoint. In this case, a first pipe may be envisioned between the VM 300C and the first endpoint of the USB device 113A, a second pipe may be envisioned between the VM 300C and the second endpoint of the USB device 113A, a third pipe may be envisioned between the VM 300C and the first endpoint of the USB device 113B, and a fourth pipe may be envisioned between the VM 300C and the second endpoint of the USB device 113B. At a next step 404, the XHCI emulator 252C divides all of the guest TDs processed at the step 402 into different groups, based on the pipe involved in the transfer. Note that each pipe will consist of all IN transfers or all OUT transfers because a single endpoint cannot be set up for both IN transfers and OUT transfers, except that control transfers can be both IN and OUT transfers. The XHCI emulator 252C also keeps track of which frame each processed TD came from.

Next, at a step 406, the XHCI emulator 252C considers the guest TDs in each pipe separately, and groups the TDs in each pipe into URBs. The XHCI emulator 252C does not consider guest TDs for which USB transfers have already been initiated, however. Thus, for example, the XHCI emulator 252C may consider all of the new TDs for a first pipe first and group those TDs into one or more URBs, then, the XHCI emulator 252C may consider all of the new TDs for a second pipe next and group those TDs into one or more other URBs, and so on. For each pass through the method of FIG. 5, the XHCI emulator 252C may generate zero, one or more new URBs for each pipe for which the XHCI emulator 252C processes one or more TDs. For host URBs containing OUT transfers, the XHCI emulator 252C also copies data from appropriate guest TDs to the corresponding host URB(s).

In grouping TDs for a given pipe into URBs, the XHCI emulator 252C attempts to recreate the guest URBs that gave rise to the TDs for that pipe. Generally, the closer the XHCI emulator 252C can come to accurately recreating the guest URBs, the more efficient the virtualization of the USB interface will be overall. One way to attempt to recreate the guest URBs involves scanning the TDs for IOC flags that are set. For a given pipe, the XHCI emulator 252C processes TDs beginning with the TD that is most proximate to the currently active frame and then moves on to the next most proximate TD, and so on. The XHCI emulator 252C scans these TDs for a set IOC flag, and it begins grouping these TDs into a first URB. If the XHCI emulator 252C encounters a TD with a set IOC flag, the XHCI emulator 252C assumes that the boundary between guest URBs is near, because USB bus drivers typically don't set IOC flags in TDs, except for the last one or more TDs that correspond to a given guest URB.

Thus, for example, referring to FIG. 4, the USB bus driver 354B typically would not set the IOC flag in the TD1A 371A or in the TD2A 373A because these are the first TDs corresponding to their respective URBs 370 and 372. The USB bus driver 354B typically would set the IOC flag in the TD1C 371C and in the TD2C 373C because these are the last TDs corresponding to their respective URBs 370 and 372. In this manner, higher levels of software can be notified of the completion of USB transfers when the transfer of an entire URB is complete.

The USB host controller driver 354C may also set the IOC flag in the TD1B 371B or in the TD2B 373B, just in case the setting of the IOC flag in the last TD (TD1C 371C or TD2C 373C) is missed. Thus, looking at all of the TDs that result from a given URB, a consecutive group of one or more TDs at the end of the group will typically have their IOC flags set. All other TDs in the group typically will not have their IOC flags set. Thus, starting from the first TD in a group that derives from a given URB, a consecutive group of one or more TDs typically will not have their IOC flags set, then a consecutive group of one or more TDs typically will have their IOC flags set. If there are any additional TDs that do not have their IOC flags set, then these TDs are typically from the next URB.

Thus, returning to the method for attempting to recreate the guest URBs during the step 406, the XHCI emulator 252C continues grouping consecutive TDs into the first URB until it encounters a TD that has a set IOC flag, and then it continues grouping consecutive TDs into the first URB until it encounters a subsequent TD that does not have a set IOC flag. That first TD that does not have its IOC flag set, after the group of one or more consecutive TDs that did have their IOC flags set, is grouped into a second URB. Next, consecutive TDs are processed in the same manner for the second URB, and so on.

Now, suppose that, for the first URB during a pass through the method of FIG. 5, or for any subsequent URB, the end of the URB cannot be established in this manner. In specific, suppose, as a first alternative, that none of the remaining TDs for a given pipe have their IOC flags set. Typically this would mean that the guest URB that gave rise to this set of TDs has not yet been fully processed. As a second alternative, suppose that one or more consecutive TDs at the very end of this set of TDs have their IOC flags set, but there are no TDs after these TDs that do not have their IOC flags set. In this case, also, the guest URB that gave rise to this set of TDs may not yet have been fully processed either, because one or more additional TDs could be generated from this guest URB that also have their IOC flags set. Thus, a conservative way to try to determine when the last TD resulting from a guest URB has been encountered is to look for a set of one or more consecutive TDs that do not have their IOC flags set, followed by a set of one or more consecutive TDs that do have their IOC flags set, followed by at least one TD that does not have its IOC flag set. For any set of TDs that do not satisfy these conditions, an assumption can be made that the set of TDs does not represent a complete URB. In this case, this partial set of TDs may nonetheless be grouped into a URB and processed, even though they may not represent a complete URB. As another alternative, this partial set of TDs may be set aside until the next time the XHCI emulator 252C performs the method of FIG. 5.

Continuing with the method of FIG. 5, the XHCI emulator 252C next optionally proceeds to a step 408. At the step 408, for each pipe that involves isochronous IN transfers, the XHCI emulator 252C may check to see if the guest TDs for that pipe were likely derived from a "circular" URB configuration. In a circular URB configuration, a set of two or more URBs are used over and over again in the same sequence. For example, a USB client driver may first set up a first URB for a first set of IN transfers from a USB device and notify a USB bus driver of the first URB. At some subsequent point in time, the USB client driver may set up a second URB for a second set of IN transfers from the USB device and notify the USB bus driver of the second URB. At some point, also, the USB bus driver may fill the first URB with data received from the USB device and notify the USB client driver that the first URB has been filled. The USB client driver will then typically retrieve the data from the first URB and process it. Also, at some subsequent point in time, the USB client driver may set up a third URB for a third set of IN transfers from the USB device and notify the USB bus driver of the third URB. At some point, also, the USB bus driver may fill the second URB with data received from the USB device and notify the USB client driver that the second URB has been filled, and the USB client driver may retrieve the data from the second URB and process it. Now, at some subsequent point in time, the USB client driver may set up the first URB again, but for a fourth set of IN transfers from the USB device, and notify the USB bus driver of the first URB again. At some point, also, the USB bus driver may fill the third URB with data received from the USB device and notify the USB client driver that the third URB has been filled, and the USB client driver may retrieve the data from the third URB and process it. At some point, also, the USB bus driver may again fill the first URB with data received from the USB device and notify the USB client driver that the first URB has been filled, and the USB client driver may retrieve the data from the first URB and process it. This process may continue indefinitely, where the USB client driver uses the first URB, the second URB and the third URB, in that order, over and over again. Such a configuration of URBs is referred to as a circular URB configuration, which are typically only used for isochronous transfers.

If the XHCI emulator 252C can identify such a circular guest IN URB configuration, the XHCI emulator 252C may be able to anticipate requested IN transfers from the guest USB client driver 354A. The XHCI emulator 252C may generate host URBs for the USB client driver 154A that contain IN transfers that the XHCI emulator 252C expects to receive from the guest software, but that have not yet been set up. Then, so long as the guest URBs (and the resulting guest TDs) are set up before the XHCI emulator 252C receives data in response to the host URBs, the XHCI emulator 252C can forward this data onto the guest using the guest TDs that resulted from the anticipated guest URBs. For all pipes for which the XHCI emulator 252C is able to identify such a circular guest IN URB configuration and use the circular URB configuration to anticipate upcoming IN transfers, the XHCI emulator 252C is generally able to provide a lower average time for responding to guest URBs for those pipes.

To identify a circular URB configuration, the XHCI emulator 252C looks for consistency between multiple guest URBs (as recreated in multiple host URBs). In fact, this approach can lead to more efficient virtualization of a USB interface even if a circular URB configuration is not used by the guest, so long as the guest URBs are consistent, as described herein. Thus, for isochronous IN transfers, the XHCI emulator 252C scans all of the guest TDs that have been grouped into a host URB to determine the size of data buffer that is pointed to by the TD. If all of these data buffers for all of the TDs in a host URB are the same size, for all of multiple host URBs, and if the multiple host URBs all include the same number of guest TDs, then a conclusion can be drawn that the guest URBs are consistent enough to anticipate upcoming guest URBs. The number of host URBs that are compared in this manner may be varied in different implementations of the invention. Of course, a larger number of host URBs that are compared in this manner means that the conclusion that guest URBs can be anticipated is safer.

Once the XHCI emulator 252C concludes that the guest URBs for a pipe involving IN transfers are consistent enough to anticipate guest URBs, the XHCI emulator 252C may also elect to create a larger number of host URBs and forward them to the host. For example, if guest software uses a circular URB configuration consisting of 3 different URBs, the XHCI emulator 252C may nonetheless send more than 3 host URBs to the host at one time. Using this technique, the XHCI emulator 252C is less likely to drop data received from the USB device, which avoids gaps in the data stream received by higher levels of software.

Continuing with the method of FIG. 5, a next step 410 is a decision block. At this decision block 410, if this pass through the method of FIG. 5 was initiated by an IOC interrupt from the host, the method proceeds to a step 412, while, if this pass was initiated because of the 1 millisecond timer, the method proceeds to a step 424.

If this pass was initiated by an IOC interrupt, then there should be a host URB available for processing, which should include the results of the USB transfers that were specified therein. If this host URB ("the filled host URB") specified IN transfers, then the filled host URB should now include data that has been retrieved from an addressed USB device. At the step 412, the XHCI emulator 252C copies the results (and data for IN transfers) from the filled host URB to active guest TDs that correspond to the same pipe. These active guest TDs were determined in the steps 402 and 404 above, during the present pass through the method of FIG. 5. These active guest TDs may differ, however, from the guest TDs that were used to create the host URB earlier. For example, the guest software may have removed one or more active guest TDs after their USB transfers were initiated, but before the transfers were completed. Thus, when the USB transfers are completed, some of the guest TDs that initiated the transfers may no longer exist. Nonetheless, the XHCI emulator 252C begins filling currently active guest TDs using the contents of the filled host URB, even if the currently active guest TDs are different from the ones that initiated the transfers.

Next, at a step 414, if the amount of data in the filled host URB exceeds the amount of data that can be filled into the currently active guest TDs for the corresponding pipe, then the XHCI emulator 252C marks an error in at least one of the guest TDs.

Next, at a step 416, the XHCI emulator 252C marks all of the guest TDs that were filled in the step 412 as no longer being active.

Next, at a step 418, the XHCI emulator 252C updates queue heads in the frame list, as appropriate. Queue heads are described in the USB System Architecture book and in the XHCI specifications. Very briefly, the frame list may include queue heads for interrupt transactions, control transactions and bulk transactions, each of which points to a first TD in a linked list queue of guest TDs. If the first TD in a queue is filled and marked as no longer being active, then the XHCI emulator 252C modifies the corresponding queue head to point to the first TD in the linked list that remains active, for example.

Next, at a step 420, the XHCI emulator 252C updates the XHCI frame pointer associated with the virtual XHCI controller 312A, as appropriate. The filling in of active guest TDs in the step 412 and marking them as no longer being active in the step 416 may have caused one or more frames of the frame list to no longer contain any active guest TDs. The XHCI emulator 252C begins at the currently active frame and determines whether any of the guest TDs in the frame remain active. If there are active isochronous TDs in the frame, then the XHCI frame pointer is not updated at all. If there are no active isochronous TDs in that first frame, then the XHCI emulator 252C proceeds on to subsequent frames until it finds a frame that still has one or more active isochronous TDs. The XHCI emulator 252C then updates the XHCI frame pointer to point to this first frame that still has one or more active isochronous TDs. Because these guest TDs are grouped back into URBs and processed in bulk (at least at this point in the software stack), this updating of the XHCI frame pointer may cause it to jump past several frames, so that several frames would never have been the active frame. For example, suppose that all of the guest TDs in the first 10 frames are no longer active, except for the guest TDs that correspond to a single host URB. When this host URB is filled as a result of USB transfers and a host IOC interrupt, then these remaining active guest TDs in the first 10 frames will be filled, marked as no longer being active, and the XHCI frame pointer will jump at least 10 frames to the next frame that still has active guest TDs.

It is possible that guest software could detect that the XHCI frame pointer for the virtual XHCI controller 312A is jumping over frames from time to time. For example, the USB controller driver 354C could poll the XHCI frame pointer every millisecond or so. If the virtual XHCI controller 312A were an actual, physical controller, the XHCI frame pointer would increment by one every 1 millisecond. But, with the virtual XHCI controller 312A, as emulated by the XHCI emulator 252C according to this embodiment of the invention, the XHCI frame pointer may continue pointing at the same frame for a number of milliseconds in a row, and then the pointer may jump over several frames to point to a new frame. However, guest software typically does not check to see how the XHCI frame pointer changes. There is generally no need for guest software to monitor the XHCI frame pointer, and so any such monitoring would generally be a waste of system resources.

Next, at a step 422, the XHCI emulator 252C raises an IOC interrupt in the VM 300C if one or more of the guest TDs that were filled in the step 412 have their IOC flags set.

Next, at a step 424, the XHCI emulator 252C generates or sets up new host URBs, as appropriate, for sending on to the host. One or more sets of guest TDs may have been grouped into URBs during the step 406 earlier in this pass through the method of FIG. 5. Some of those guest TDs may have been filled and marked as no longer being active, though, during the steps 412 and 416 earlier in this pass. Also, one or more circular guest IN URB configurations may have been identified during the step 408. Combining all of these factors, the XHCI emulator 252C can determine and set up a set of zero or more host URBs that are ready to be sent on to the host.

Next, at a step 426, the XHCI emulator 252C sends any new host URB(s) on to the host. More specifically, the XHCI emulator 252C notifies the USB client driver 154A of the new host URB(s) (through the VM application 260A in the hosted virtual computer system of FIG. 1). The XHCI emulator 252C also keeps track of which guest TDs have been included in host URBs sent on to the host.

Next, the method of FIG. 5 ends at a terminal step 428. The method of FIG. 5 will be run over and over again at each 1 millisecond timer interval and upon each IOC interrupt from the host.

This invention is particularly useful in handling isochronous USB transactions, although it may also be used to handle interrupt transactions, control transactions and bulk transactions. Some differences arise, however, in handling these different types of transactions. For example, different isochronous transfers for a single pipe typically use a constant data size for each URB and for each TD, while the data size for different bulk transfers for the same pipe often varies. Thus, for example, more care must be taken for bulk transactions when filling in guest TDs based on a filled host URB because different active guest TDs may point to data buffers having different sizes.

Now, a more realistic example may be helpful in explaining why this invention is particularly useful in handling isochronous USB transactions. Suppose that the USB device 113A is a web cam that has a USB interface. The USB client driver 354A may set up a circular IN URB configuration that includes 5 guest URBs. Each guest URB may contain a data buffer large enough for 30 frames of data. Thus, the 5 guest URBs together can contain 150 frames of data. The USB client driver 354A may set up new guest URBs at an average speed of one new URB every 30 milliseconds, so that it can continue receiving web cam data at the maximum throughput of the isochronous pipe. This also means that the USB client driver 354A may expect to get an IOC interrupt every 30 milliseconds, on average, with a filled guest URB at each interrupt. Now the USB client driver 354A typically would not care if individual TDs of data are transferred every 1 millisecond, as specified in the XHCI specification, so long as the USB client driver 354A receives a filled URB every 30 milliseconds. Because the XHCI emulator 252C recombines guest TDs into host URBs and processes them in bulk, the XHCI emulator 252C effectively has 30 milliseconds to obtain results for a host URB, instead of just 1 millisecond to obtain results for a given guest TD. The 30 millisecond goal is much easier to attain in existing computer systems than the 1 millisecond goal.

Also, as mentioned above, the closer the XHCI emulator 252C comes to recreating the guest URBs when generating host URBs, the more effective the overall USB virtualization becomes. If the XHCI emulator 252C creates host URBs that are smaller than the guest URBs, then the XHCI must go through multiple iterations to fill a single guest URB, which is not as efficient as going through just one iteration. Conversely, if the XHCI emulator 252C creates host URBs that are larger than the guest URBs, then the guest software must generally wait for an entire, larger host USB to be filled before a guest URB is filled, which generally means greater latency.

What is claimed is:

1. A method for virtualizing a communications channel in which blocks of data are divided into multiple sub-blocks for conveyance, the method being implemented in a computer system in which one or more host drivers provide an interface with a physical device that supports the communications channel, a virtualization software emulates a virtual device that appears to support the communications channel, and one or more guest drivers provide an interface with the virtual device, wherein the one or more guest drivers receive multiple guest data block buffers for use in conveying data over the communications channel and generate multiple corresponding guest data sub-block buffers for individual guest data block buffers, wherein the virtualization software obtains access to the guest data sub-block buffers, and wherein the one or more host drivers expect to access host data block buffers, the method comprising:

scanning guest data sub-block buffers for an indication of a first boundary between a first guest data block buffer and a second guest data block buffer, wherein the indication of the first boundary between the guest data block buffers includes a guest data sub-block buffer in the data sub-block buffers having a flag that is set followed by a guest data sub-block buffer having the flag that is not set;

scanning additional guest data sub-block buffers for an indication of a second boundary between the second guest data block buffer and a third guest data block buffer, wherein the indication of the second boundary between the guest data block buffers includes a guest data sub-block buffer in the additional guest data sub-block buffers having a flag that is set followed by a guest data sub-block buffer having the flag that is not set; and forming a host data block buffer encompassing the guest data sub-block buffers between the first boundary and the second boundary, and making the host data block buffer available to the one or more host drivers.

2. The method of claim 1, wherein the communications channel comprises a USB (Universal Serial Bus) interface, the guest data block buffers and host data block buffers are USB request block buffers, and the guest data sub-block buffers are transfer descriptors.

3. The method of claim 2, wherein the physical device is an OHCI (Open Host Controller Interface) controller, a UHCI (Universal Host Controller Interface) controller, or an EHCI (Enhanced Host Controller Interface) controller.

4. The method of claim 2, wherein the virtual device is an OHCI (Open Host Controller Interface) controller, a UHCI (Universal Host Controller Interface) controller, or an EHCI (Enhanced Host Controller Interface) controller.

5. The method of claim 2, wherein an indication of a boundary between multiple guest data block buffers comprises one or more transfer descriptors having an IOC (Interrupt on Complete) flag that is set followed by one or more transfer descriptors having an IOC flag that is not set.

6. The method of claim 1, wherein an indication of a boundary between multiple guest data block buffers comprises one or more guest data sub-block buffers having an interrupt flag that is set followed by one or more guest data sub-block buffers having an interrupt flag that is not set.

7. The method of claim 1, wherein the first, second and third guest data block buffers represent IN transfers.

8. The method of claim 1, wherein the first, second and third guest data block buffers represent OUT transfers, and wherein the step of forming the host data block buffer comprises copying data from guest data sub-block buffers to the host data block buffer.

9. A computer program embodied in a computer readable medium, the computer program being executable in a computer system to virtualize a communications channel in which blocks of data are divided into multiple sub-blocks for conveyance, the computer system having (a) one or more host drivers that provide an interface with a physical device that supports the communications channel, (b) a virtualization software that emulates a virtual device that appears to support the communications channel, and (c) one or more guest drivers that provide an interface with the virtual device, wherein the one or more guest drivers receive multiple guest data block buffers for use in conveying data over the communications channel and generate multiple corresponding guest data sub-block buffers for individual guest data block buffers, wherein the virtualization software obtains access to the guest data sub-block buffers, and wherein the one or more host drivers expect to access host data block buffers, wherein the computer program performs the following steps:

scanning guest data sub-block buffers for an indication of a first boundary between a first guest data block buffer and a second guest data block buffer, wherein the indication of the first boundary between the guest data block buffers includes a guest data sub-block buffer in the data sub-block buffers having a flag that is set followed by a guest data sub-block buffer having the flag that is not set;

scanning additional guest data sub-block buffers for an indication of a second boundary between the second guest data block buffer and a third guest data block buffer, wherein the indication of the second boundary between the guest data block buffers includes a guest data sub-block buffer in the additional guest data sub-block buffers having a flag that is set followed by a guest data sub-block buffer having the flag that is not set; and forming a host data block buffer encompassing the guest data sub-block buffers between the first boundary and the second boundary, and making the host data block buffer available to the one or more host drivers.

10. The computer program of claim 9, wherein the communications channel comprises a USB (Universal Serial Bus) interface, the guest data block buffers and host data block buffers are USB request block buffers, and the guest data sub-block buffers are transfer descriptors.

11. The computer program of claim 10, wherein the physical device is an OHCI (Open Host Controller Interface) controller, a UHCI (Universal Host Controller Interface) controller, or an EHCI (Enhanced Host Controller Interface) controller.

12. The computer program of claim 10, wherein the virtual device is an OHCI (Open Host Controller Interface) controller, a UHCI (Universal Host Controller Interface) controller, or an EHCI (Enhanced Host Controller Interface) controller.

13. The computer program of claim 10, wherein an indication of a boundary between multiple guest data block buffers comprises one or more transfer descriptors having an IOC (Interrupt on Complete) flag that is set followed by one or more transfer descriptors having an IOC flag that is not set.

14. The computer program of claim 9, wherein an indication of a boundary between multiple guest data block buffers comprises one or more guest data sub-block buffers having an interrupt flag that is set followed by one or more guest data sub-block buffers having an interrupt flag that is not set.

15. The computer program of claim 9, wherein the first, second and third guest data block buffers represent IN transfers.

16. The computer program of claim 9, wherein the first, second and third guest data block buffers represent OUT transfers, and wherein the step of forming the host data block buffer comprises copying data from guest data sub-block buffers to the host data block buffer.

17. A computer system in which a communications channel is virtualized, wherein blocks of data are divided into multiple sub-blocks for conveyance over the communications channel, the computer system comprising:
  a physical device that supports the communications channel;
  one or more host drivers that provide an interface with the physical device;
  a virtualization software that emulates a virtual device that appears to support the communications channel; and
  one or more guest drivers that provide an interface with the virtual device, wherein the one or more guest drivers receive multiple guest data block buffers for use in conveying data over the communications channel and generate multiple corresponding guest data sub-block buffers for individual guest data block buffers, wherein the virtualization software obtains access to the guest data sub-block buffers, and wherein the one or more host drivers expect to access host data block buffers, wherein the virtualization software:
  scans guest data sub-block buffers for an indication of a first boundary between a first guest data block buffer and a second guest data block buffer, wherein the indication of the first boundary between the guest data block buffers includes a guest data sub-block buffer in the data sub-block buffers having a flag that is set followed by a guest data sub-block buffer having the flag that is not set;
  scans additional guest data sub-block buffers for an indication of a second boundary between the second guest data block buffer and a third guest data block buffer, wherein the indication of the second boundary between the guest data block buffers includes a guest data sub-block buffer in the additional guest data sub-block buffers having a flag that is set followed by a guest data sub-block buffer having the flag that is not set; and
  forms a host data block buffer encompassing the guest data sub-block buffers between the first boundary and the second boundary, and makes the host data block buffer available to the one or more host drivers.

18. The computer system of claim 17, wherein the communications channel comprises a USB (Universal Serial Bus) interface, the guest data block buffers and host data block buffers are USB request block buffers, and the guest data sub-block buffers are transfer descriptors.

19. The computer system of claim 18, wherein the physical device is an OHCI (Open Host Controller Interface) controller, a UHCI (Universal Host Controller Interface) controller, or an EHCI (Enhanced Host Controller Interface) controller.

20. The computer system of claim 18, wherein the virtual device is an OHCI (Open Host Controller Interface) controller, a UHCI (Universal Host Controller Interface) controller, or an EHCI (Enhanced Host Controller Interface) controller.

21. The computer system of claim 18, wherein an indication of a boundary between multiple guest data block buffers comprises one or more transfer descriptors having an IOC (Interrupt on Complete) flag that is set followed by one or more transfer descriptors having an IOC flag that is not set.

22. The computer system of claim 17, wherein an indication of a boundary between multiple guest data block buffers comprises one or more guest data sub-block buffers having an interrupt flag that is set followed by one or more guest data sub-block buffers having an interrupt flag that is not set.

23. The computer system of claim 17, wherein the first, second and third guest data block buffers represent IN transfers.

24. The computer system of claim 17, wherein the first, second and third guest data block buffers represent OUT transfers, and wherein forming the host data block buffer comprises copying data from guest data sub-block buffers to the host data block buffer.

* * * * *